(12) United States Patent
Sponselee

(10) Patent No.: US 10,259,511 B2
(45) Date of Patent: Apr. 16, 2019

(54) TRAILER, SUPPORT WHEEL AXLE AND METHOD FOR UNCOUPLING AND COUPLING A TRAILER

(76) Inventor: Wouter Marcel Sponselee, Vogelwaarde (NL)

(*) Notice: Subject to any disclaimer, the term of this patent is extended or adjusted under 35 U.S.C. 154(b) by 606 days.

(21) Appl. No.: 14/390,599

(22) PCT Filed: Apr. 5, 2012

(86) PCT No.: PCT/NL2012/050227
§ 371 (c)(1),
(2), (4) Date: Mar. 26, 2015

(87) PCT Pub. No.: WO2013/151417
PCT Pub. Date: Oct. 10, 2013

(65) Prior Publication Data
US 2015/0210326 A1    Jul. 30, 2015

(51) Int. Cl.
*B62D 53/08* (2006.01)
*B60D 1/66* (2006.01)
*B62D 59/04* (2006.01)

(52) U.S. Cl.
CPC ......... *B62D 53/0857* (2013.01); *B60D 1/665* (2013.01); *B62D 53/0864* (2013.01); *B62D 59/04* (2013.01); *Y10T 29/49817* (2015.01)

(58) Field of Classification Search
CPC . B62D 53/0857; B62D 53/0864; B62D 59/04
USPC ..................................................... 280/476.1
See application file for complete search history.

(56) References Cited

U.S. PATENT DOCUMENTS

| 2,846,018 | A | * | 8/1958 | Puckett | B60P 3/127 |
| | | | | | 180/14.1 |
| 4,475,612 | A | * | 10/1984 | Anderson | B60D 1/075 |
| | | | | | 180/14.2 |
| 6,290,248 | B1 | * | 9/2001 | Yrigoyen | B60D 1/07 |
| | | | | | 280/416.1 |
| 6,820,887 | B1 | * | 11/2004 | Riggle | B62D 53/0864 |
| | | | | | 280/405.1 |
| 7,934,743 | B1 | * | 5/2011 | Wall | B60D 1/015 |
| | | | | | 280/476.1 |
| 2011/0074132 | A1 | * | 3/2011 | Banwart | B61D 3/187 |
| | | | | | 280/476.1 |

FOREIGN PATENT DOCUMENTS

| DE | 102009032754 A1 | 1/2011 |
| EP | 1555178 A1 | 7/2005 |
| EP | 1900618 A1 | 3/2008 |
| WO | 2011104435 A1 | 9/2011 |

OTHER PUBLICATIONS

International Search Report and Written Opinion dated Dec. 12, 2012 (PCT/NL2012/050227); ISA/EP.

* cited by examiner

*Primary Examiner* — Tony H Winner
(74) *Attorney, Agent, or Firm* — Banner & Witcoff, Ltd.

(57) ABSTRACT

Trailer particularly provided with a device for removing and/or arranging a bundle from and/or in a heat exchanger, comprising at least one wheel axle, wherein the trailer can be coupled to a tractive vehicle, wherein at least one support wheel axle is connectable to the trailer for the purpose of independently supporting the trailer in at least an uncoupled state thereof.

14 Claims, 3 Drawing Sheets

TRAILER, SUPPORT WHEEL AXLE AND METHOD FOR UNCOUPLING AND COUPLING A TRAILER

TECHNICAL FIELD

The present invention relates to a trailer, particularly provided with a device for removing and/or arranging a bundle from and/or in a heat exchanger, comprising at least one wheel axle, wherein the trailer comprises a coupling which is adapted to couple the trailer to a tractive vehicle. The invention also relates to a support wheel axle and a method for uncoupling and coupling a trailer.

BACKGROUND

Frequent use is made in industry of tube heat exchangers provided with a tube bundle for throughfeed of for instance a gas or a liquid. In order to clean these heat exchangers this bundle has to be removed from the heat exchanger. Provided for this purpose are so-called bundle extractors which are adapted to pull a tube bundle out of a sleeve of the heat exchanger and to arrange these bundles in such a sleeve. The bundle extractor must be able to support the bundle independently during and after removal of this bundle.

It is known to arrange such devices for removing bundles from a heat exchanger and inserting such bundles into a heat exchanger on a trailer, particularly in the form of a semi-trailer. Such a trailer is normally provided with a wheel axle, and more often with a plurality of wheel axles, for the purpose of supporting the trailer. Such a wheel axle is provided with at least two wheels close to the outer ends of this axle. A coupling point is then provided at a distance from this wheel axle for coupling of the trailer to the tractive vehicle, for instance in the form of a truck.

This trailer can then be placed by a tractive vehicle in front of a heat exchanger to be treated so that the bundle extractor can pull the bundle out of the heat exchanger. It is a drawback of these existing trailers that a tractive vehicle is necessary for the use of the bundle extractor. Such an assembly of a trailer and a tractive vehicle moreover takes up much space, which is not always available.

It is therefore an object of the present invention to provide a simple and/or efficient trailer, in particular provided with a device for removing a bundle from a heat exchanger.

BRIEF SUMMARY

The trailer of the type stated in the preamble has for this purpose the special feature that at least one support wheel axle comprises a connection adapted for connecting to the trailer for the purpose of independently supporting the trailer in at least an uncoupled state thereof. The support wheel axle can be connected here to the trailer in order to independently support the trailer in at least an uncoupled state thereof. By connecting a support wheel axle to the trailer, the trailer, for instance provided with a bundle extractor, can remain standing independently without a tractive vehicle having to be coupled thereto. This makes it possible to use the bundle extractor on the trailer without a tractive vehicle having to be present.

It must be noted that independent support is understood in this context to mean that the trailer, for instance in the form of a semi-trailer, and for instance the arranged bundle extractor can function without additional support being necessary here from for instance a tractive vehicle. The distance between the wheel axle and the support wheel axle is for this purpose preferably sufficiently great to provide a strong support.

Although reference is made to a bundle extractor or a device for removing a bundle from a heat exchanger, it must furthermore be noted that such a device can moreover be adapted to insert a bundle into such a heat exchanger.

At least one of the wheel axle and the support wheel axle is preferably connectable to a drive for driving the trailer in at least the uncoupled state. The trailer particularly comprises a drive, for instance a motor, which is adapted to drive the trailer in at least the uncoupled state, wherein at least one of the wheel axle and the support wheel axle is operatively connected to the drive. A suitable transmission, which is as such known, can be provided for this purpose. This makes it possible for the trailer to be displaceable in uncoupled state without the assistance of a tractive vehicle. The tractive vehicle can then for instance deliver the trailer close to the heat exchanger and, by connecting a support wheel axle, the trailer can be moved independently to the heat exchanger. At least one of the wheel axle and the support wheel axle is more preferably steerable for this purpose. At least one of the wheel axle and the support wheel axle particularly comprises a steering axle which is operatively connected to a steering device for steering the trailer in uncoupled state. This enables an efficient alignment of the trailer. The support wheel axle is preferably steerable. The other wheel axle can then be arranged fixedly here on the trailer. Steerable must in this context be understood to mean that it is possible to steer the trailer using the steerable axle. The wheel axle can be provided for this purpose with a drive for rotating the wheel axle. It can however also be possible to arrange the wheels in steerable manner on the wheel axle, wherein turning of the wheels relative to the wheel axle provides for steering. The trailer can be provided for this purpose with a steering wheel. It can also be possible to remotely control the trailer.

Particularly in combination with the connectable drive the trailer can be independently aligned relative to the heat exchanger without the assistance of a tractive vehicle. According to the invention it is thus possible in simple manner to convert a trailer, in particular a trailer provided with a bundle extractor, to a self-propelled unit. Although self-propelled bundle extractors as such are for instance known, these self-propelled bundle extractors have the drawback that they cannot be transported efficiently on the public highway. They generally have to be loaded onto a trailer for transport purposes. The invention thus provides a trailer which can be coupled easily to a tractive vehicle for transport purposes, but which can be easily converted on site to a self-propelled unit, and vice versa.

According to a preferred embodiment of the trailer according to the invention, the trailer can be coupled to the tractive vehicle close to a first outer end of the trailer, wherein the wheel axle extends close to the second outer end of the trailer and wherein the support wheel axle is connectable close to the first outer end in at least the uncoupled state. In other words, the support wheel axle and the trailer are adapted to connect close to the first outer end in at least the uncoupled state. The support wheel axle is preferably arranged here at the position where the trailer is coupled to the tractive vehicle. The support wheel axle is connectable here close to an outer end of the trailer which can be coupled to the tractive vehicle. This provides a sufficiently large wheelbase between the support wheel axle and the fixed wheel axle and thereby provides a good support.

In a further preferred embodiment of the trailer according to the invention the trailer can be coupled to the tractive vehicle close to a first outer end of the trailer, and the support wheel axle is connectable close to the second outer end of the trailer in at least the coupled state. In other words, the support wheel axle and the trailer are adapted to connect close to the second outer end of the trailer in at least the coupled state. When the trailer is coupled to the tractive vehicle, the support wheel axle can be arranged on the rear side of the trailer. In this way the support wheel axle can easily be transported together with the combination of the trailer and the tractive vehicle. When the tractive vehicle is subsequently uncoupled, the support wheel axle can be removed from the second outer end of the trailer and the wheel axle can preferably be connected close to the first outer end of the trailer for firm support thereof.

According to a further preferred embodiment of the trailer according to the invention, the trailer comprises a coupling point for coupling the trailer to a tractive vehicle, wherein the coupling point is connectable to the support wheel axle. The connection of the support wheel axle is more particularly adapted to connect to the coupling point. The coupling point used for coupling of a tractive vehicle is moreover adapted here to couple the support wheel axle. This results in a simple assembly of the trailer. Particularly when the support wheel axle takes a steerable form, it is advantageous to couple the support wheel axle to the coupling point of the trailer, since this coupling point is able to enter into a rotatable coupling. The coupling between the trailer and the tractive vehicle can for instance comprise a fifth wheel, wherein the trailer is provided with a pin.

According to a further preferred embodiment the support wheel axle comprises a pressure distributor. A pressure distributor, also referred to as a trailing axle, is used to alleviate the axle loads of for instance a trailer or a tractive vehicle on the road surface through distribution thereof. It is therefore mandatory at some locations to use such a pressure distributor. According to the invention it is possible to use this trailing axle or pressure distributor as support wheel axle for the purpose of independently supporting, and preferably independently driving and making a trailer steerable. The invention further relates to a support wheel axle connectable to the trailer according to the invention. The support wheel axle preferably comprises a connection which is adapted to be connected to a coupling point of a trailer. The support wheel axle can be provided here with a connection similar to a coupling arranged on a tractive vehicle for connecting the tractive vehicle to a trailer, for instance in the form of a fifth wheel. An efficient coupling is in this way provided between trailer and support wheel axle.

According to a further preferred embodiment of the support wheel axle, the support wheel axle can be connected, or is adapted to be connected, to a tractive vehicle and/or a second outer end of a trailer opposite a first outer end of the trailer connectable to a tractive vehicle. The support wheel axle can hereby be easily transported in the coupled state of the trailer by connecting the support wheel axle to the rear of the trailer. By furthermore making the support wheel axle connectable to a trailer, a trailer can be used to position the support wheel axle under the trailer for an efficient connection. In this way the support wheel axle can moreover serve as pressure distributor for a trailer and/or a tractive vehicle. The support wheel axle is provided for this purpose with suitable connecting means for connection to a trailer and/or a tractive vehicle such as are known for a conventional pressure distributor.

The invention also relates to the use of a support wheel axle, in particular a pressure distributor, or trailing axle, according to the invention for supporting a trailer. Such a support axle, in particular a pressure distributor, is provided for this purpose with an additional coupling for connecting the support wheel axle to the trailer, preferably at the position of the coupling between the trailer and the tractive vehicle in the uncoupled state.

The invention further relates to an assembly of a trailer and a support wheel axle according to the invention, wherein the support wheel axle is preferably connected close to an outer end of the trailer which can be coupled to a tractive vehicle.

The invention further relates to a method for uncoupling a trailer, particularly provided with a device for removing a bundle from a heat exchanger, from a tractive vehicle, comprising the steps of:
  providing a support wheel axle;
  uncoupling the trailer from the tractive vehicle; and
  connecting the support wheel axle to the trailer for the purpose of independently supporting the trailer in the uncoupled state.

Arranging a support wheel axle on the trailer after the trailer has been uncoupled from the tractive vehicle can also provide for a firm support of the trailer in this uncoupled state, so that for instance a device for removing a bundle from a heat exchanger can be safely used. The support wheel axle is preferably connected close to a first outer end of the trailer, this outer end being connectable to a tractive vehicle.

Connection of the support wheel axle more preferably comprises of connecting the support wheel axle to a coupling point of the trailer.

According to a preferred embodiment of the method, the method comprises of providing a support wheel axle which is connected to a second outer end of the trailer opposite a first outer end of the trailer connectable to the tractive vehicle. The support wheel axle is connected here in the coupled state to the rear side of a trailer, and when the trailer is uncoupled this support wheel axle can be removed from the rear side and arranged on the front side, i.e. the first outer end, of the trailer in order to firmly support the trailer.

According to a further preferred embodiment of the method, connecting the support wheel axle comprises of coupling the support wheel axle to a tractive vehicle and, using the tractive vehicle, positioning the support wheel axle for connection to the trailer. After providing the support wheel axle, for instance by removing it from the rear side of the trailer, it is coupled to the tractive vehicle so that this latter can move the support wheel axle in efficient manner under the trailer for an efficient alignment of the trailer and tractive vehicle.

The invention further relates to a method for coupling a trailer, particularly provided with a device for removing a bundle from a heat exchanger, according to the invention to a tractive vehicle, comprising the steps of:
  removing a support wheel axle from the trailer; and
  coupling the tractive vehicle to the trailer.

Removing the support wheel axle preferably comprises of coupling the support wheel axle to the tractive vehicle and removing the support wheel axle using the tractive vehicle. The method more preferably also comprises of connecting the support wheel axle to a second outer end of the trailer opposite a first outer end of the trailer connectable to the tractive vehicle. The support wheel axle can then be utilized as pressure distributor, or trailing axle.

BRIEF DESCRIPTION OF DRAWINGS

The invention will be further elucidated with reference to figures shown in the drawing of a preferred embodiment of the invention, in which.

DETAILED DESCRIPTION

Figure 1:
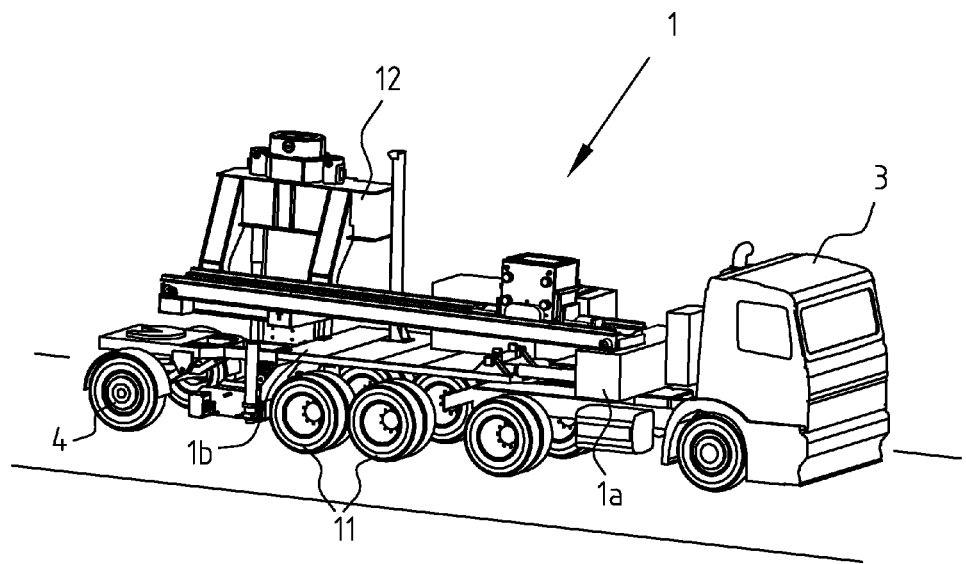
FIG. 1 shows a tractive vehicle with trailer and pressure distributor in coupled state.

FIG. 1 shows trailer 1 in a position coupled to a tractive vehicle 3. Arranged on trailer 1 is a bundle extractor 12 which is adapted to pull bundles out of a heat exchanger. The trailer 1 is connected on the front side 1a to the tractive vehicle 3, and close to the rear side 1b of the trailer the trailer 1 has two wheel axles 11. In order to further distribute the pressure on the road surface a pressure distributor in the form of a trailing axle 4 is provided on the rear side 1b of the trailer 1.

Figure 2:
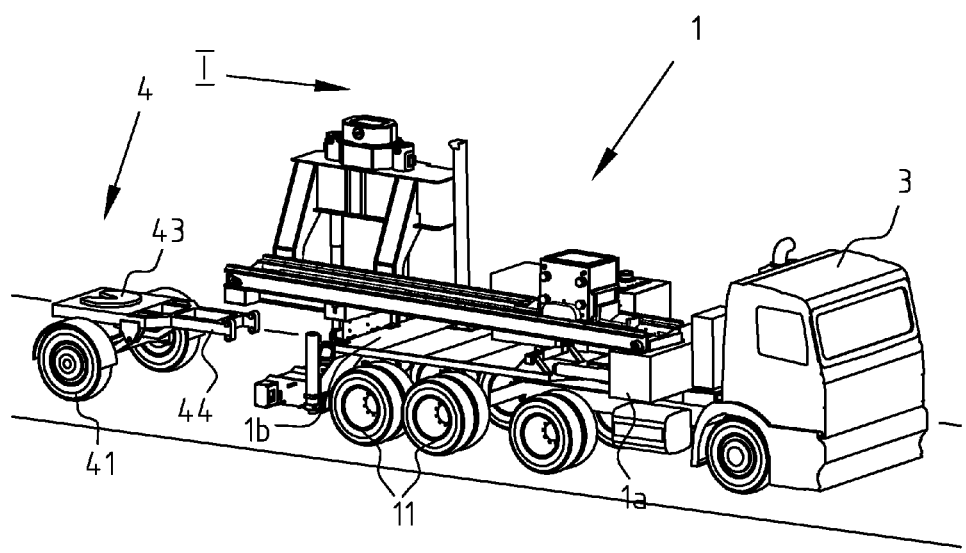
FIGS. 2-5 show the different stages of uncoupling.

As shown in more detail in FIG. 2, pressure distributor 4 has an additional wheel axle 41, to the outer ends of which are connected two wheels. Using a coupling 44 pressure distributor 4 can be connected to the rear side 1b of trailer 1 which is adapted for connection to coupling 44. In the coupled state as shown in FIG. 1, trailer 1 with bundle extractor 12 can be transported in efficient manner over the road network.

When bundle extractor 12 now has to be deployed at for instance a factory site, it is advantageous to obtain the smallest possible assembly for the bundle extraction. For this purpose trailer 1 is uncoupled from tractive vehicle 3, as will be described in more detail below.

Firstly, pressure distributor 4 is uncoupled from the rear side 1b of the trailer by releasing the coupling 44 and moving the assembly of tractive vehicle 3 and trailer 1 in a direction I. The pressure distributor is now separated from trailer 1, as shown in FIG. 2.

Figure 3:
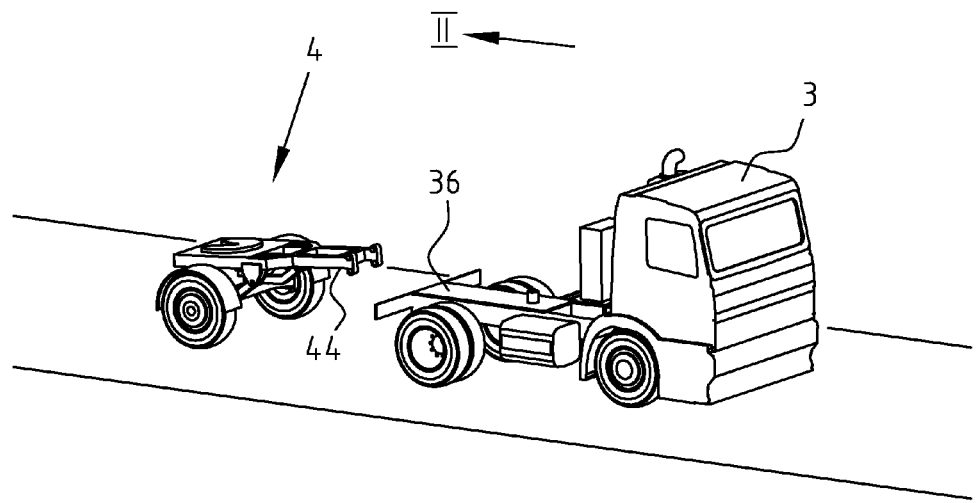
Figure 4:
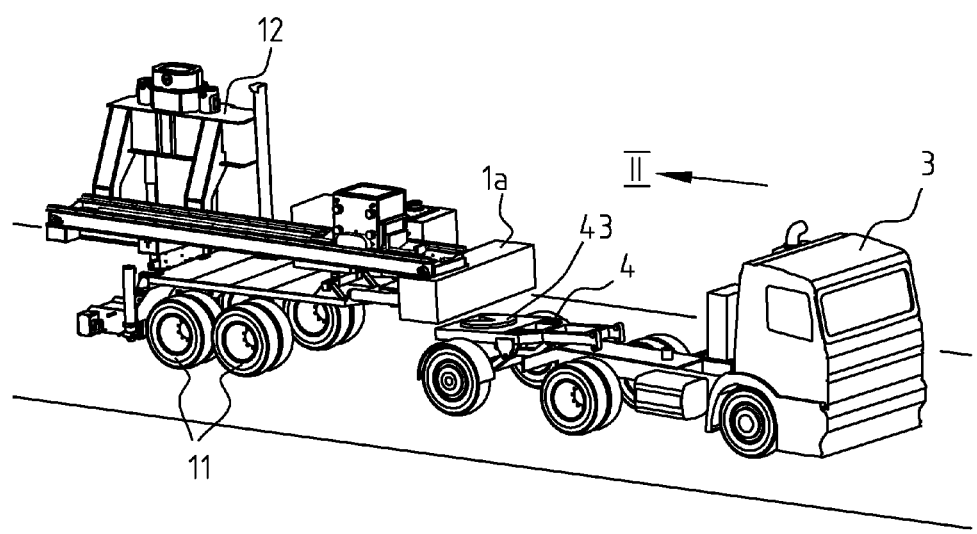

Trailer 1 is then uncoupled from tractive vehicle 3. The trailer is now in the uncoupled state. The trailer provided with two wheel axles 11 is however unable as such to pull bundles or to support pulled bundles. The support is insufficient for this purpose. Pressure distributor 4 is then connected with coupling 44 to the rear side 36 of tractive vehicle 3, for instance by moving tractive vehicle 3 in a direction designated with II in FIG. 3. Once tractive vehicle 3 and the pressure distributor have been coupled as shown in FIG. 4, the pressure distributor can be efficiently coupled to trailer 1 by moving the assembly of tractive vehicle 3 and pressure distributor 4 in a direction designated with II.

As also shown in FIG. 2, pressure distributor 4 is provided on an upper side with a coupling 43 in the form of a fifth wheel. Coupling 43 corresponds to the coupling of tractive vehicle 3 for the purpose of connecting tractive vehicle 3 to trailer 1. By moving pressure distributor 4 in a direction II, coupling 43 is connected to coupling point 13 in the form of a pin of trailer 1.

Figure 5:
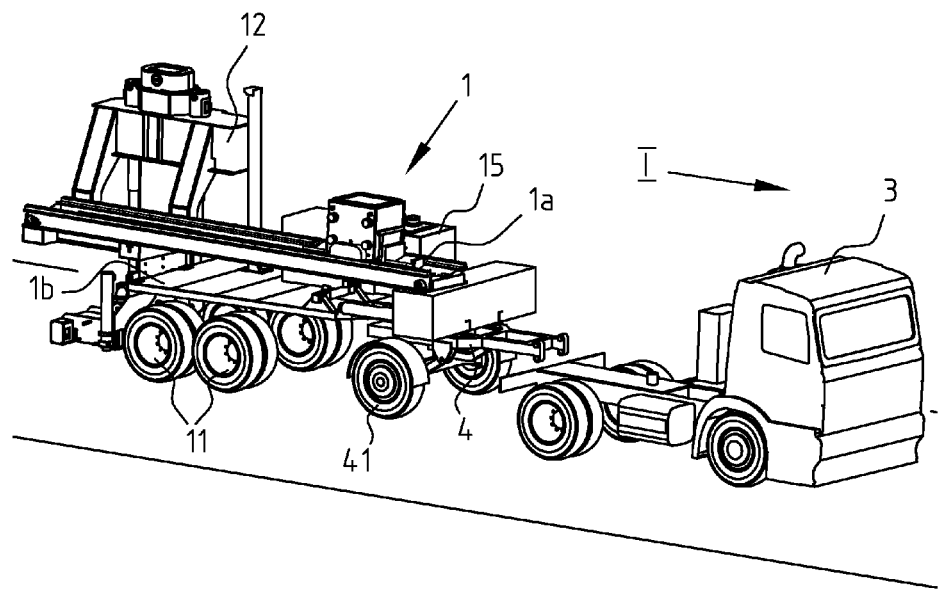

When pressure distributor 4 has been firmly coupled to trailer 1, tractive vehicle 3 can be uncoupled from pressure distributor 4 and tractive vehicle 3 can move away in a direction I, see FIG. 5. Trailer 1 is now firmly supported by wheel axles 11 and 41. As shown in FIG. 5, wheel axles 11 extend on the rear side 1b of the trailer and wheel axle 41 close to the front side 1a of the trailer. The thus obtained wheelbase ensures a good, firm support of trailer 1 and allows utilization of bundle extractor 12 in the situation as shown in FIG. 5.

Figure 6:
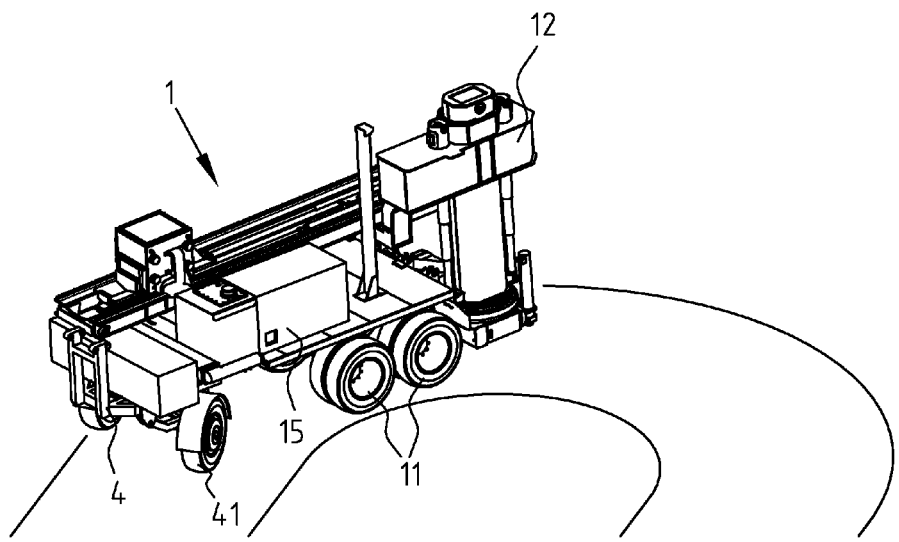
FIG. 6 shows the trailer in uncoupled state.

Trailer 1 is moreover provided with a drive 15 in the form of a motor for driving one of the wheel axles 11 of trailer 1. Trailer 1 thus takes a self-propelled form. Because the support wheel axle in the form of pressure distributor 4 moreover takes a steerable form, trailer 1 with bundle extractor 12 can be efficiently positioned in front of a heat exchanger to be treated, as shown schematically in FIG. 6.

With the trailer and the pressure distributor according to the invention it is thus possible to convert a trailer provided with a bundle extractor to a self-propelled bundle extractor. This makes the use of a tractive vehicle 3 on the factory site unnecessary, since the trailer 1 provided with the steerable additional wheel axle 4 takes a self-propelled and self-steering form. Tractive vehicle 3 can now be utilized for other purposes and the assembly of trailer 1 and pressure distributor 4 moreover results in a very compact assembly.

It is noted that the invention is not limited to the shown embodiments, but also extends to other preferred variants falling within the scope of the appended claims.

The invention claimed is:

1. An assembly comprising:
   a trailer provided with a device for removing a bundle from a heat exchanger, arranging the bundle in the heat exchanger, or a combination thereof, the trailer comprising a wheel axle and a coupling which is adapted to couple the trailer to a tractor; and
   a support wheel axle comprising a connection adapted for connecting to the trailer for the purpose of independently supporting the trailer in at least an uncoupled state thereof,
   wherein the trailer comprises a drive operatively connected to at least one of the wheel axle and the support wheel axle and adapted to drive the trailer in at least the uncoupled state, and wherein at least one of the wheel axle and the support wheel axle comprises a steering axle which is operatively connected to a steering device for steering the trailer in the uncoupled state.

2. The assembly as claimed in claim 1, wherein the trailer is configured to be coupled to the tractor proximate to a first outer end of the trailer, wherein the wheel axle extends proximate to a second outer end of the trailer and wherein the support wheel axle and the trailer are adapted to connect proximate to the first outer end in at least the uncoupled state.

3. The assembly as claimed in claim 1, wherein the trailer is configured to be coupled to the tractor proximate to a first outer end of the trailer, and wherein the support wheel axle and the trailer are adapted to connect proximate to a second outer end of the trailer in at least a coupled state.

4. The assembly as claimed in claim 1, wherein the trailer comprises a coupling point for coupling the trailer to the tractor, wherein the connection of the support wheel axle is adapted to connect to the coupling point.

5. The assembly as claimed in claim 1, wherein the support wheel axle comprises a pressure distributor.

6. A support wheel axle connectable to a trailer having a device for removing a bundle from a heat exchanger, arranging the bundle in the heat exchanger, or a combination thereof comprising at least one wheel axle, and a coupling which is adapted to couple the trailer to a tractor, the support wheel axle comprising: a connection adapted for connecting to the trailer for the purpose of independently supporting the trailer in at least an uncoupled state thereof, wherein the support wheel axle is operatively connectable to a drive on the trailer which is adapted to drive the trailer in at least the uncoupled state, and wherein the support wheel axle comprises a steering axle which is operatively connectable to a steering device for steering the trailer in the uncoupled state.

7. The support wheel axle as claimed in claim 6, wherein the support wheel axle comprises a connection which is adapted to be connected to a coupling point of the trailer.

8. The support wheel axle as claimed in claim 6, wherein the support wheel axle is adapted to be connected to the tractor, a second outer end of the trailer opposite a first outer end of the trailer connectable to the tractor, or a combination thereof.

9. A method for uncoupling a trailer from a tractor, wherein the trailer is provided with a device for removing a bundle from a heat exchanger, arranging the bundle in the heat exchanger, or a combination thereof, a wheel axle, and a coupling which is adapted to couple the trailer to the tractor, the method comprising the steps of:
   providing a support wheel axle comprising a connection adapted for connecting to the trailer for the purpose of independently supporting the trailer in at least an uncoupled state thereof;
   uncoupling the trailer from the tractor; and
   connecting the support wheel axle to the trailer for the purpose of independently supporting the trailer in the uncoupled state,
   wherein the trailer comprises a drive operatively connected to at least one of the wheel axle and the support wheel axle and adapted to drive the trailer in at least the uncoupled state, and wherein at least one of the wheel axle and the support wheel axle comprises a steering axle which is operatively connected to a steering device for steering the trailer in the uncoupled state.

10. The method as claimed in claim 9, wherein the providing step comprises providing the support wheel axle, which is connected to a second outer end of the trailer opposite a first outer end of the trailer connectable to the tractor.

11. The method as claimed in claim 9, wherein the connecting step comprises coupling the support wheel axle to the tractor and, using the tractor, positioning the support wheel axle for connection to the trailer.

12. The method of claim 9, further comprising:
   removing the support wheel axle from the trailer; and
   coupling the tractor to the trailer.

13. The method as claimed in claim 12, wherein the removing of the support wheel axle comprises coupling the support wheel axle to the tractor and removing the support wheel axle using the tractor.

14. The method as claimed in claim 12, further comprising connecting the support wheel axle to a second outer end of the trailer opposite a first outer end of the trailer connectable to the tractor.

* * * * *